(12) United States Patent
Cooper et al.

(10) Patent No.: US 6,833,121 B2
(45) Date of Patent: Dec. 21, 2004

(54) OZONE GENERATOR

(76) Inventors: Donald M. Cooper, 121 Edgecliffe Place, Burlington, Ontario (CA), L7L 3Z2; Vitali Gringuaz, 264 Charlton Avenue, Thornhill, Ontario (CA), L4J 6H1

( * ) Notice: Subject to any disclaimer, the term of this patent is extended or adjusted under 35 U.S.C. 154(b) by 0 days.

(21) Appl. No.: 10/384,176

(22) Filed: Mar. 6, 2003

(65) Prior Publication Data
US 2004/0033179 A1 Feb. 19, 2004

Related U.S. Application Data

(63) Continuation of application No. 09/730,319, filed on Dec. 4, 2000, now abandoned.

(30) Foreign Application Priority Data

Dec. 3, 1999 (CA) .............................................. 2291525

(51) Int. Cl.⁷ ................................................. B01J 19/08
(52) U.S. Cl. .............................. 422/186.19; 422/186.2; 422/186.18
(58) Field of Search ....................... 422/186.07, 186.11, 422/186.18, 186.19, 186.2

(56) References Cited

U.S. PATENT DOCUMENTS

| | | | |
|---|---|---|---|
| 4,013,567 A | * 3/1977 | Emelyanov et al. ... | 422/186.19 |
| 4,696,739 A | 9/1987 | Pedneault .................... | 210/121 |
| 5,008,087 A | 4/1991 | Batchelor .............. | 422/186.22 |
| 5,097,556 A | 3/1992 | Engel et al. .................... | 8/158 |
| 5,181,399 A | 1/1993 | Engel et al. ................. | 68/13 R |
| 5,241,720 A | 9/1993 | Engel et al. .................... | 8/158 |
| 5,354,541 A | 10/1994 | Sali et al. .............. | 422/186.07 |
| 5,404,732 A | 4/1995 | Kim ........................... | 68/13 R |
| 5,493,743 A | 2/1996 | Schneider et al. ........... | 8/149.2 |
| 5,625,915 A | 5/1997 | Radler et al. ................... | 8/158 |
| 5,806,120 A | 9/1998 | McEachern .................... | 8/158 |
| 5,960,501 A | 10/1999 | Burdick ......................... | 8/158 |
| 5,960,649 A | 10/1999 | Burdick ..................... | 68/12.12 |

OTHER PUBLICATIONS

Albuquerque, M. et al., "Ozone Washing Process the First Year of Operation", article, Aug. 1997, pp. 191–198.

* cited by examiner

Primary Examiner—James J. Seidleck
Assistant Examiner—Thao T. Tran
(74) Attorney, Agent, or Firm—Anissimoff and Associates; Robert A. H. Brunet

(57) ABSTRACT

An ozone generator comprises an electrode located within a dielectric tube with a ground electrode formed on the outer surface of the tube. The tube and ground electrode are surrounded by a coding jacket to allow the coolant to come into contact with the ground electrode and provide efficient cooling.

22 Claims, 3 Drawing Sheets

OZONE GENERATOR

CROSS-REFERENCE TO RELATED APPLICATIONS

This application is a continuation of U.S. utility patent application Ser. No. 09/730,319, filed 4 Dec. 2000 (the '319 application), now abandoned which in turn corresponds to and claims priority to Canadian Application No. 2,291,525, filed 3 Dec. 1999 (the '525 application). The '319 and '525 applications are hereby incorporated by reference as though fully set forth herein.

BACKGROUND OF THE INVENTION a. Field of the Invention

The present invention relates to an ozone generator.

b. Background Art

Ozone is a gas that has an aggressive oxidizing action and is used among other things to sterilize water. In this application the gas is bubbled through the water and contaminants are oxidized and may be removed during the subsequent processing.

Ozone may be generated by subjecting an oxygen bearing gas, typically air, to a high intensity electric field. The electric field is applied by imposing a high frequency voltage between a pair of electrodes as air passes between the electrodes.

The application of the high voltage at high frequency generates significant heat which must be removed by cooling. In typical installation the voltage is applied to an active electrode and the electric field established between the active electrode and a ground electrode. The electrodes face each other and the gas is passed between them to generate the ozone. The ground electrode is supported on an insulating structure which in turn is encompassed by a cooling jacket.

The application of high frequency current to the electrode produces significant heat which in turn must be removed efficiently by the cooling jacket. The efficiency of the ozone generation is in part a function of the temperature of the gas and accordingly efficient heat removal is a prime consideration. However the support of the electrode within an insulating structure inhibits heat transfer from the ozone-producing region and thereby limits the efficiencies that may be attained in conventional apparatus.

BRIEF SUMMARY OF THE INVENTION

It is therefore an object of the present invention to provide an ozone generator in which the above disadvantages are obviated or mitigated.

In general terms the present invention provides an ozone generator comprising an active electrode to be connected to a power supply, a housing encompassing said electrode to define an enclosed chamber through which gas can flow and having a wall formed from a dielectric material, a ground electrode disposed on the opposite side of said wall to said electrode and a coolant contacting said ground electrode to remove heat therefrom.

BRIEF DESCRIPTION OF THE DRAWINGS

An embodiment of the invention will now be described by way of example only with reference to the accompanying drawings in which.

DESCRIPTION OF THE PREFERRED EMBODIMENTS

Figure 1:
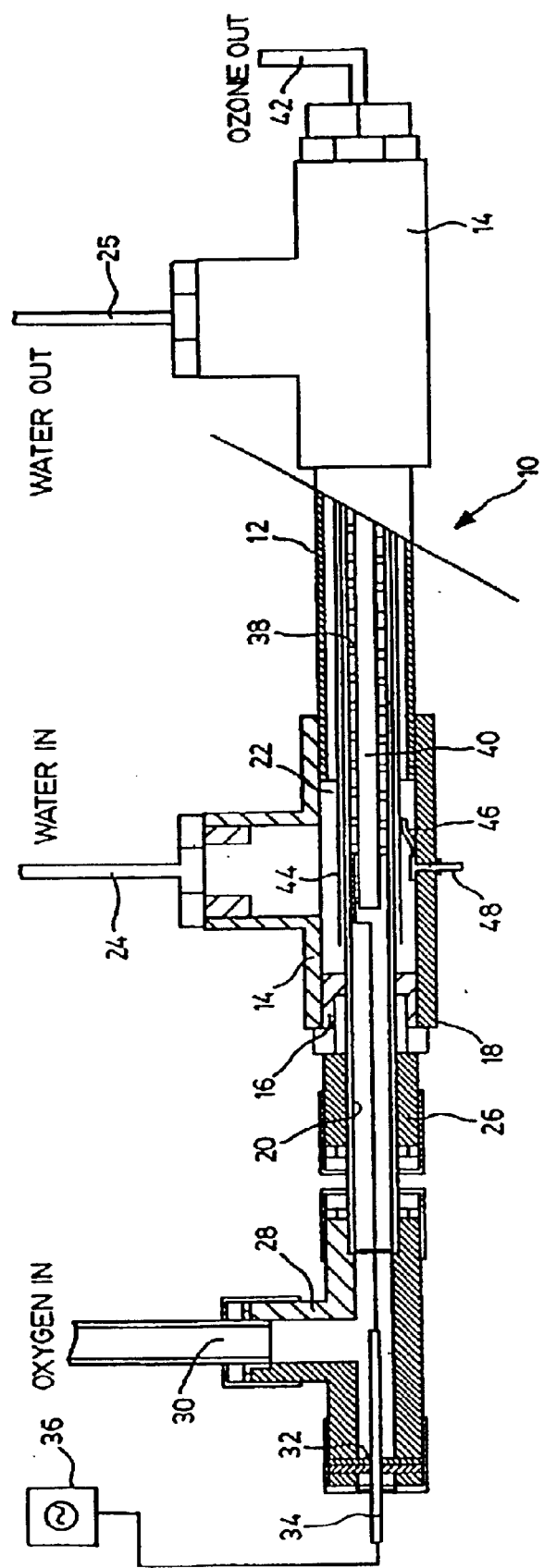
FIG. 1 is a side view, partly in section of an ozone generator.
Figure 2:
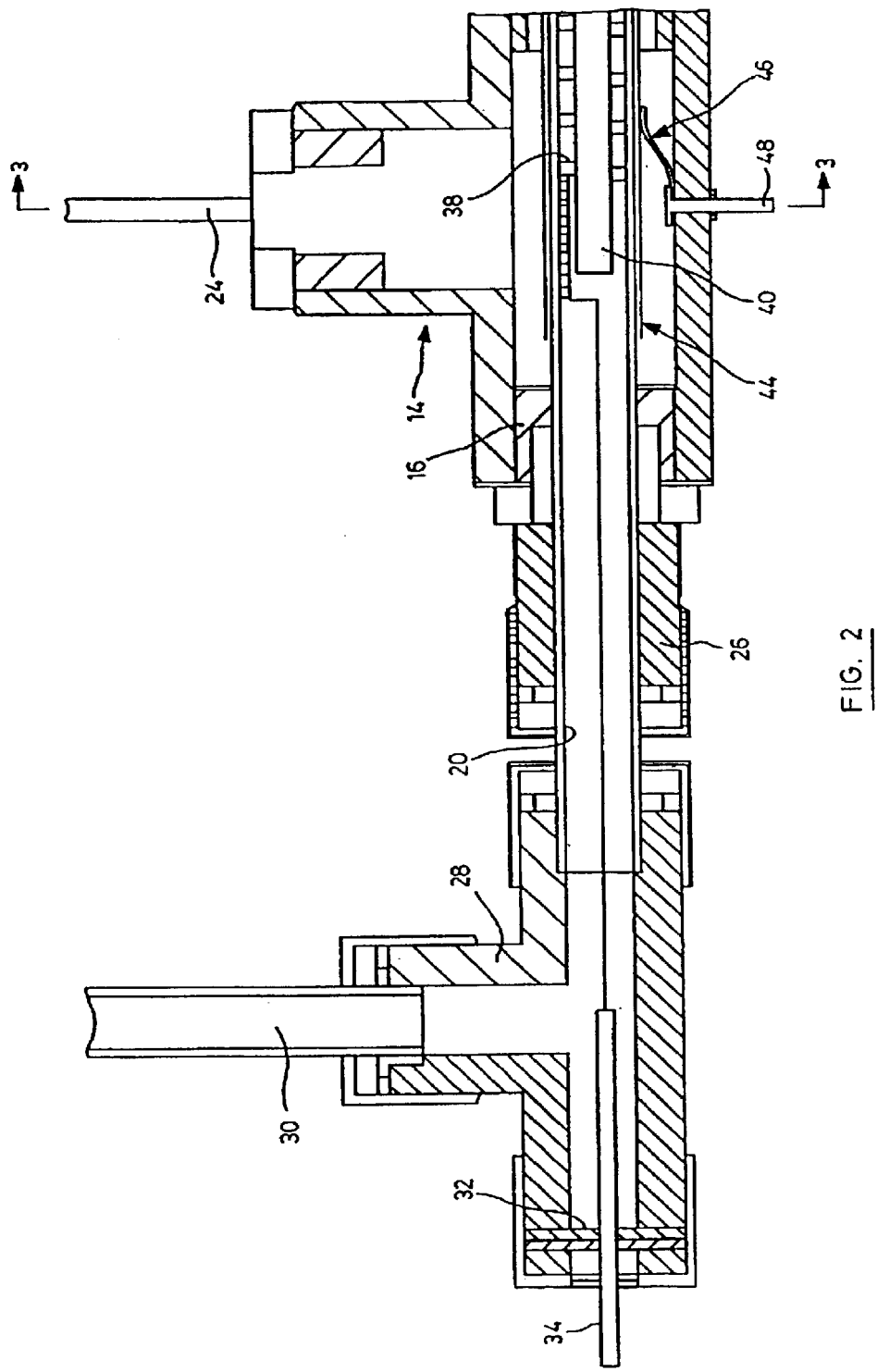
FIG. 2 is an enlarged view of a portion of the generator shown in FIG. 1.
Figure 3:
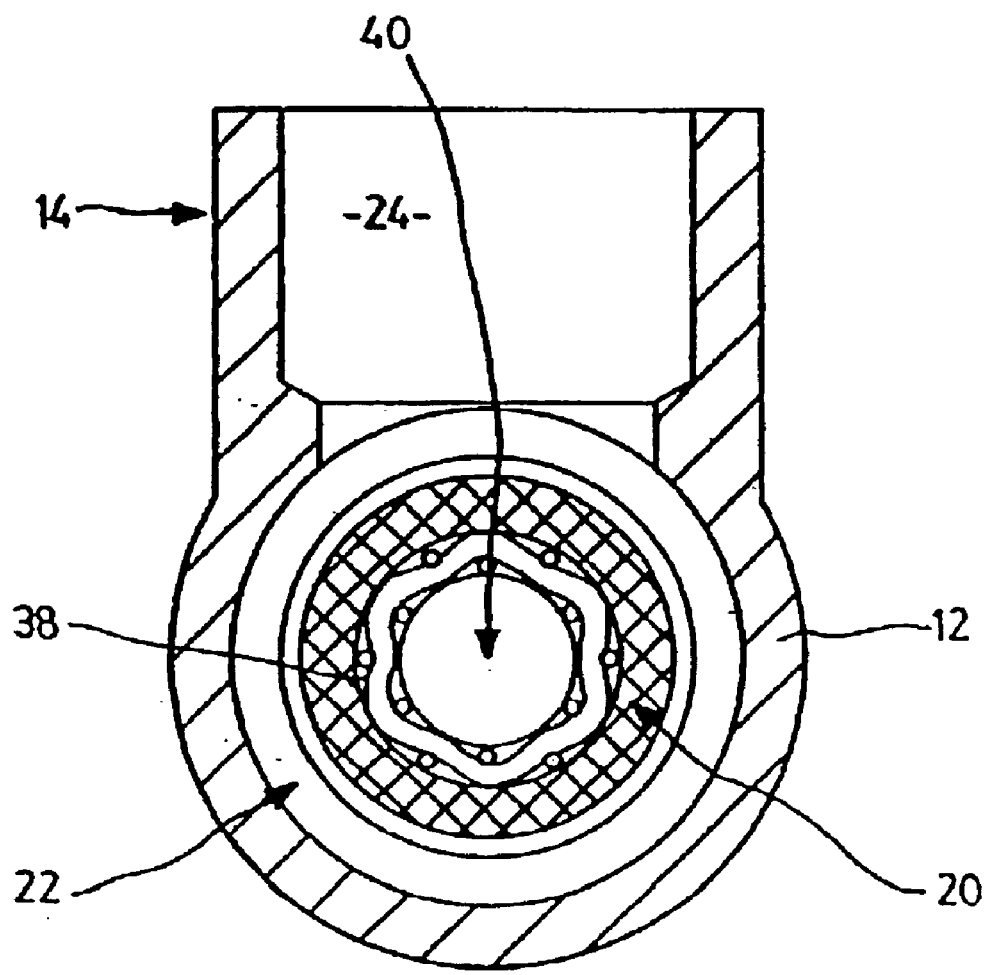
FIG. 3 is a section on the line 3—3 of FIG. 2.

Referring therefore to FIG. 1, an ozone generator generally indicated 10 includes an outer tubular body 12 extending between a pair of T fittings 14. Each of the T fittings 14 has an end cap 16 with a through bore 18 to receive a support tube 20. The support tube 20 is formed by a wall of a dielectric material, typically ceramics and extends through the body 12 to project beyond each of the end caps 16. The tube 20 and the body 12 in conjunction with the end caps 16 define a cooling chamber 22 through which water can circulate from an inlet port 24 in one branch of one of the fittings 14 to a corresponding outlet port 25 on the other fitting. The tube 20 extends through a protective boss 26 to a second T fitting 28. The fitting 28 has a gas inlet port 30 that receives a supply of oxygen gas and a sealing plate 32 in the branch aligned with the tube 20. The sealing plate 32 supports an electrical conductor 34 that is connected to a high voltage oscillating power source 36. The power source 36 is a power unit available from Plasma Technics Inc. of Rancine, Wis. and provides a 6-kilovolt supply at 20 kilohertz.

The conductor 34 passes through the interior of the tube 20 and is connected to an electrode 38. The electrode 38 comprises a stainless steel wire mesh that is supported on a cylindrical dielectric rod 40 within the tube 20. The mesh 38 is wrapped about the rod 40 and provides a sliding fit within the interior of the tube 20. The interweaving of the mesh 38 provides voids through which the gas may pass from the inlet 30 along the interior of the tube to an outlet 42 in the opposite end fitting 14.

A ground electrode 44 is formed on the outer surface of the tube 20 from a conductive epoxy coating. Typically the electrode 44 is a silver filled epoxy such as that available from Chomerics Div. of Parker Hannifin Corp. of Wolburn, Me.

The ground electrode 44 is connected through cable 46 to a ground terminal 48 provided in the fitting 14.

In operation, oxygen bearing gas typically air or air enriched with oxygen is fed through the inlet 30 and along the interior of the tube 20 to the outlet 42. Power is supplied from the power supply 36 to the electrode 38 to generate an alternating electric field between the electrodes 38, 44. As the gas passes the electrode a portion of the oxygen in the gas is converted to ozone and passing through the outlet 42.

The heat generated is removed by water flowing through the inlet 24 and through the chamber 22 to the outlet 25. The water is in intimate contact with the ground electrode 44 and thus provides an efficient heat removal.

During operation, the close fit of the grid between the rod 40 and the tube 20 promotes turbulence in the gas flow to facilitate the conversion process. In preliminary tests, ozone generation in the order of 10 grams per hour has been achieved using a 6-kilovolt 20 hertz supply. In this arrangement, the radial spacing between the support 40 and tube 20 is in the order of 1.5 millimeters with a diameter of the rod 40 is approximately 6 millimeters. The efficiency of the cooling provided by the chamber 22 is such that the body 12 and fittings 14 may be made from PVC and the fittings in contact with the ozone are made from kynar. However it should be noted that as the cooling and ozone generation functions are separated by the tube 20 the fittings on the cooling jacket may be conventional PVC fittings.

The dielectric tube 20 and rod 40 are preferably an alumina ceramic AD 998 available from Coors Ceramics Company, Golden, Colo. or an equivalent material.

Enhanced performance from the generator may be obtained by utilizing oxygen rather than air as a feed or enriching an air stream with oxygen. An improved performance may also be attained by chilling the coolant flow to maintain the ambient temperature of the air at a minimum.

The generators 10 may be arranged in an array with similar units, either in series flow or parallel flow, to provide the requisite mass flow.

Alternative coolants may be used to water including air if sufficient heat transfer can be attained.

We claim:

1. An ozone generator comprising:
   a) an active electrode to be connected to a power supply, said active electrode located on a dielectric support;
   b) a housing encompassing said active electrode to define an enclosed chamber having an inlet and outlet to permit a gas to flow through said chamber and contact said electrode, said housing including a wall formed from a dielectric material;
   c) a ground electrode formed as a conductive coating on said wall and disposed on an opposite side of said wall to said active electrode; and,
   d) a coolant disposed on said opposite side of said wall to said active electrode to contact said ground electrode to remove heat therefrom.

2. An ozone generator according to claim 1, wherein said active electrode is tubular and wherein said dielectric support is a cylindrical rod inside said active electrode.

3. An ozone generator according to claim 1, said active electrode is formed from a wire mesh.

4. An ozone generator according to claim 3, wherein said active electrode causes turbulence in said flow of said gas.

5. An ozone generator according to claim 1, said dielectric material comprises an alumina ceramic.

6. An ozone generator according to claim 1, wherein said conductive coating comprises a conductive epoxy.

7. An ozone generator according to claim 5, wherein said conductive coating comprises a conductive epoxy.

8. An ozone generator according to claim 3, wherein said dielectric material comprises an alumina ceramic.

9. An ozone generator according to claim 3, wherein said conductive coating comprises a conductive epoxy.

10. An ozone generator according to claim 8, wherein said conductive coating comprises a conductive epoxy.

11. An ozone generator comprising:
    a) an active electrode to be connected to a power supply, said active electrode formed from a wire mesh;
    b) a housing encompassing said active electrode to define an enclosed chamber having an inlet and outlet to permit a gas to flow through said chamber and contact said electrode, said housing including a wall formed from a dielectric material;
    c) a ground electrode formed as a conductive coating on said wall and disposed on an opposite side of said wall to said active electrode; and,
    d) a coolant disposed on said opposite side of said wall to said active electrode to contact said ground electrode to remove heat therefrom.

12. An ozone generator according to claim 11, wherein said active electrode causes turbulence in said flow of said gas.

13. An ozone generator according to claim 11, wherein said dielectric material comprises an alumina ceramic.

14. An ozone generator according to claim 11, wherein said conductive coating comprises a conductive epoxy.

15. An ozone generator according to claim 13, wherein said conductive coating comprises a conductive epoxy.

16. An ozone generator according to claim 15, wherein said active electrode is located on a dielectric support.

17. An ozone generator according to claim 16, wherein said active electrode is tubular and wherein said dielectric support is a cylindrical rod inside said active electrode.

18. An ozone generator comprising:
    a) an active electrode to be connected to a power supply;
    b) a housing encompassing said active electrode to define an enclosed chamber having an inlet and outlet to permit a gas to flow through said chamber and contact said electrode, said housing including a wall formed from a dielectric material comprising an alumina ceramic;
    c) a ground electrode formed as a conductive coating on said wall and disposed on an opposite side of said wall to said active electrode; and,
    d) a coolant disposed on said opposite side of said wall to said active electrode to contact said ground electrode to remove heat therefrom.

19. An ozone generator according to claim 18, wherein said conductive coating comprises a conductive epoxy.

20. An ozone generator according to claim 19, wherein said conductive epoxy is silver filled.

21. An ozone generator according to claim 18, wherein said coolant is air.

22. An ozone generator according to claim 18, wherein the ozone generator further comprises a cooling chamber and wherein said coolant is water.

* * * * *